United States Patent [19]

Tomita

[11] Patent Number: 5,287,740
[45] Date of Patent: Feb. 22, 1994

[54] METHOD FOR LOCATING AND EXAMINING CAVITIES UNDER PAVED ROADS

[75] Inventor: Hiroshi Tomita, Tokyo, Japan

[73] Assignee: Geo Search Co., Ltd., Tokyo, Japan

[21] Appl. No.: 949,789

[22] Filed: Sep. 22, 1992

[30] Foreign Application Priority Data

Sep. 27, 1991 [JP] Japan .................. 3-249185

[51] Int. Cl.⁵ .......................... G01N 19/00
[52] U.S. Cl. .................. 73/146; 342/122; 348/85
[58] Field of Search ......... 73/146, 8; 33/551; 364/550, 556; 342/22; 358/100, 108

[56] References Cited

U.S. PATENT DOCUMENTS

| | | | |
|---|---|---|---|
| 4,698,634 | 10/1987 | Alongi et al. | 342/159 |
| 4,855,820 | 8/1989 | Barbour | 358/100 |
| 4,899,296 | 2/1990 | Khattak | 73/146 |
| 5,192,953 | 3/1993 | Tomita | 342/22 |

FOREIGN PATENT DOCUMENTS 0349110 1/1990 European Pat. Off. .
0485189 5/1992 European Pat. Off. .

OTHER PUBLICATIONS

European Search Report for EP application EP 92 30-8655.7.

*Primary Examiner*—Donald O. Woodiel
*Attorney, Agent, or Firm*—McAulay, Fisher, Nissen, Goldberg & Kiel

[57] ABSTRACT

The present invention provides a cavity examination method of a paved road which can examine cavities which are present under the paved road such as the asphalt-paved road in a reduced length of time. By collecting data of the structural conditions of areas under the paved road while traveling on the road by a pavement structure examination vehicle mounted with underground radar means, and scrutinizing according to the above results around the place which may contain a cavity by a pushcart type underground radar means, the cavity examination method of the present invention specifies presence and a planar extent of the cavity. If a cavity is actually detected, a hole with a small diameter is bored in the place and its inner circumferential wall is photographed by a camera to confirm the conditions of the cavity and the area under the pavement by a visual inspection in order to grasp the three dimensional conditions of the cavity.

10 Claims, 7 Drawing Sheets

METHOD FOR LOCATING AND EXAMINING CAVITIES UNDER PAVED ROADS

BACKGROUND OF THE INVENTION

1. Field of the Invention

The present invention relates to an examination method for cavities under paved roads. The method of the present invention can examine cavities under paved roads such as an asphalt-paved road, a concrete-paved road and an airport runway effectively and precisely.

2. Description of Related Art

Recently, subsidences of roads often occur in urban areas. Accidents caused by the subsidence are reported to responsible parties which has resulted in the recognition of the necessity of investigating for the presence of a cavity or cavities under the paved road.

However, it is not realistic to dig up all paved roads of an extensive distance for investigating underground conditions thereof, from the viewpoint of time, expenditure and traffic.

By using nondestructive cavity examination means based on an electromagnetic wave examination method, it is possible to investigate road structures without large-scale construction such as digging up of the road.

However, it is not practical, judging from examination speed, to use a pushcart type electromagnetic wave underground radar means of the conventional type. In addition, it is difficult to confirm the place detected from the results of the investigation due to troubles such as collapse of the ground caused by vibrations generated by a drive source for the cutting operation specified in the confirmation method.

SUMMARY OF THE INVENTION

The present invention intends to solve the problem that serious pavement abnormalities are often overlooked and also that a grasp of the three dimensional extent of a cavity is difficult to achieve by the examination performed along the road by using only underground radar means.

The method for examining cavities present under a paved road of the present invention, comprises the steps of detecting an abnormal portion under the paved road which may contain the cavity or a foreign substance through investigation of the paved road by a cavity examination vehicle mounted with underground radar means while traveling on the paved road as a first investigation; applying a network of investigation around the place considered to contain any abnormalities by using a pushcart type underground radar means as a secondary investigation; boring an investigation hole with a small diameter at the place wherein the cavity as well as its planar extent are determined by the secondary investigation; knowing conditions of the cavity and the ground under the paved road by photographing an inner circumferential wall of the bored investigation hole by photographic means.

DETAILED DESCRIPTION OF THE PREFERRED EMBODIMENT

Figure 1:
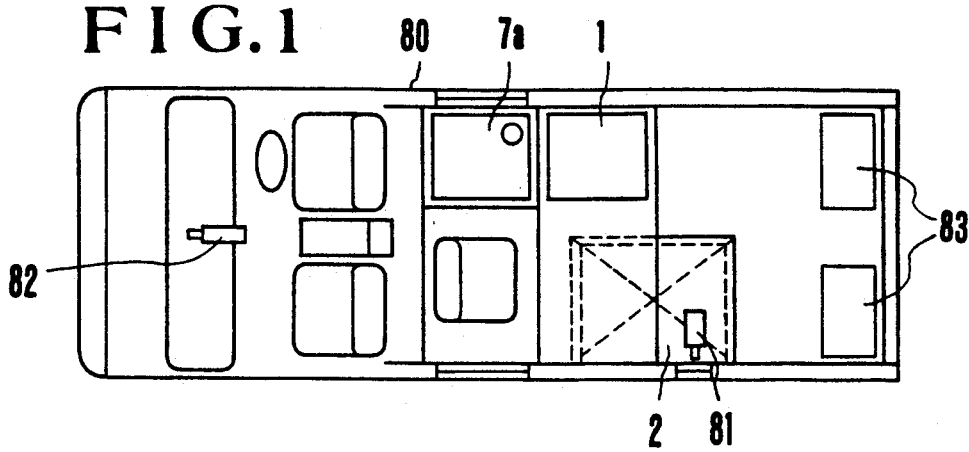
FIG. 1 shows a transverse sectional view showing an embodiment of a cavity examination vehicle which can effectively execute the present invention.

Detailed description of a cavity examination method of a paved road of the present invention will be made herein with reference to an embodiment shown in the drawings.

Figure 2:
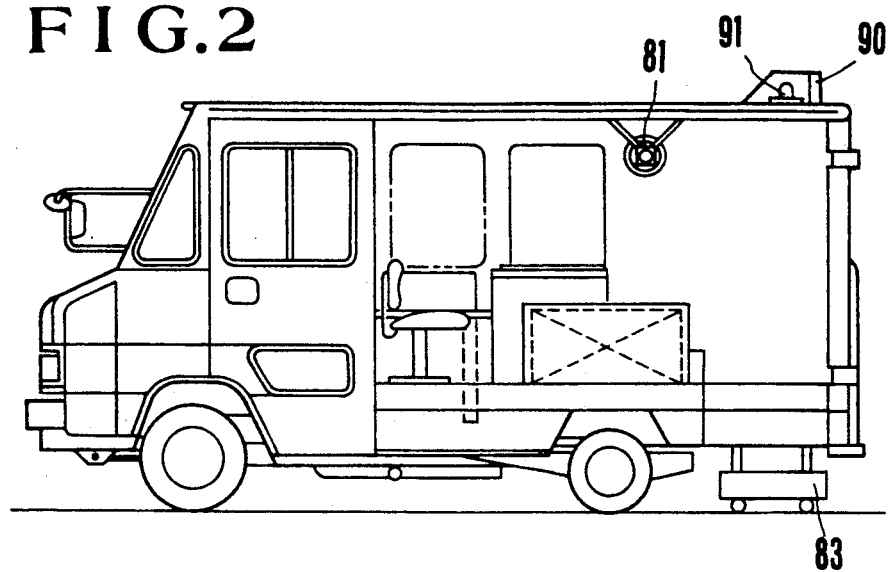
FIG. 2 shows a side view of FIG. 1.
Figure 3:
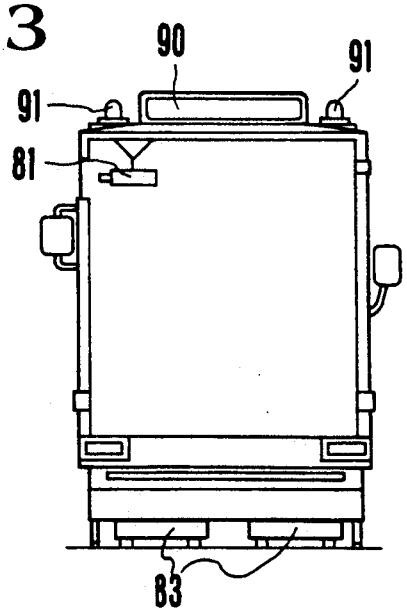
FIG. 3 shows a rear view of FIG. 1.
Figure 4:
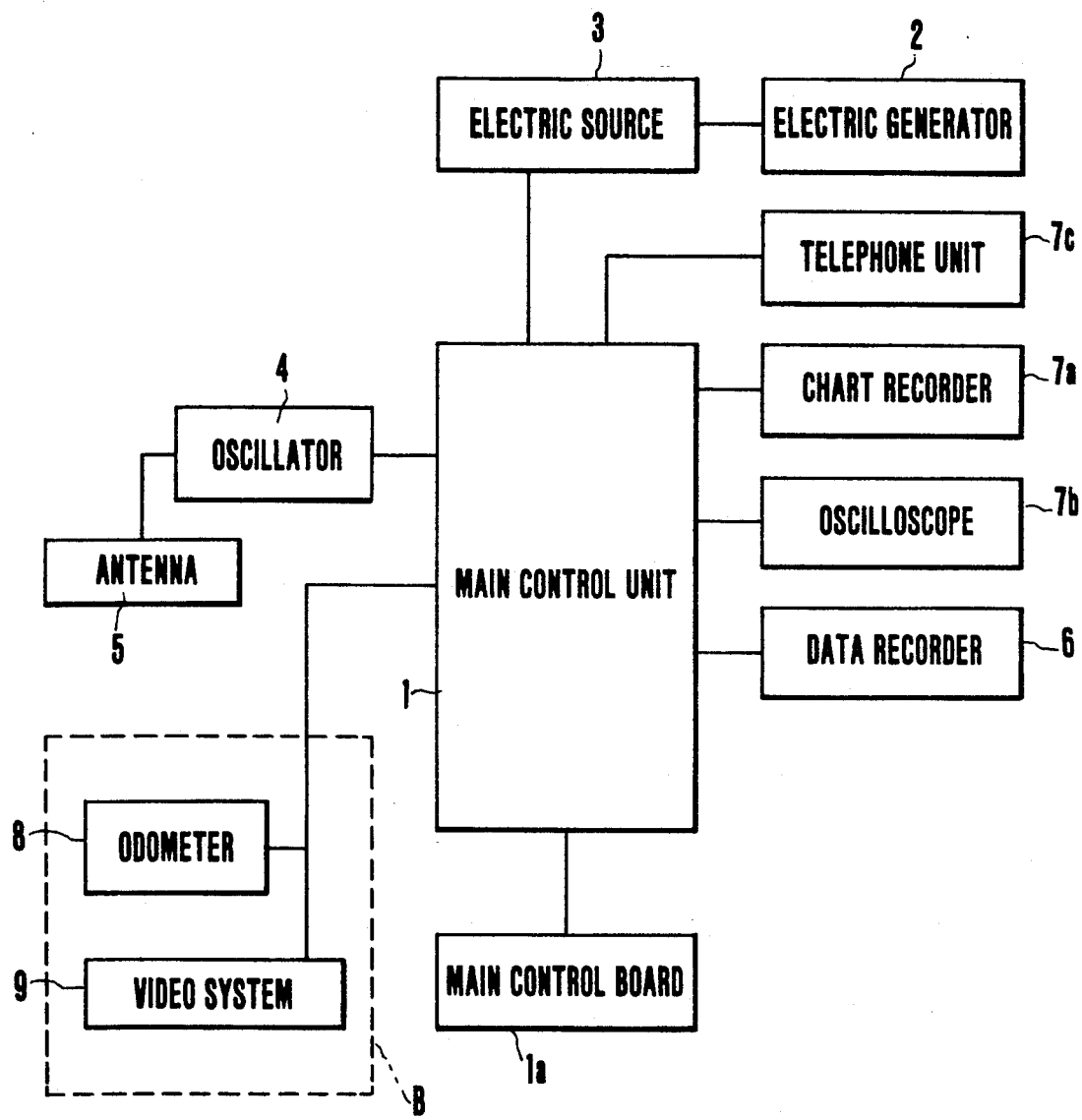
FIG. 4 a block diagram of an image processing unit.

FIG. 1 to FIG. 3 are views each showing a pavement structure examination vehicle for a primary investigation mounted with underground radar means capable of effectively performing the present invention. FIG. 4 is a block diagram showing a system of the underground radar means, FIG. 5 a view showing a principle of the underground radar means, FIG. 6 views explaining analyzed results of data obtained by the underground radar means.

Figure 5:
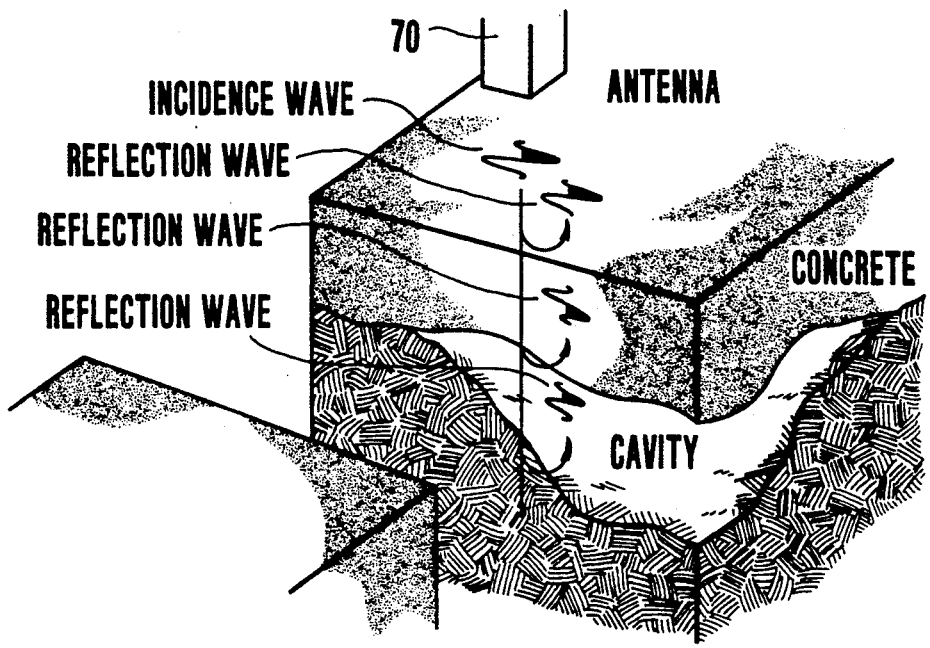
FIG. 5 shows an explanation view for the principle of the underground radar system.

In the cavity examination method of the present embodiment, a pavement structure examination vehicle for a primary investigation first investigates the under pavement condition of a traveling lane by mounted underground radar means while traveling on the road at velocity almost equal to general vehicles, and detects the place which probably contains underground cavities or foreign substances by analyzing the results obtained by the above investigation. However, according to the data obtained in the primary investigation, only an extremely narrow range of the underground structure can be examined due to a characteristic of the underground radar means, and only conditions of sections cut along the traveling direction of the vehicle can be investigated because of directivity of incident and reflective waves produced by radar 70 as shown in FIG. 5.

Therefore, a detailed secondary investigation is conducted according to the data obtained by the primary investigation, around the place wherefrom singular waves are reflected suggesting existence of cavities or foreign matters by using other pushcart type underground radar means (hereinafter referred to as a secondary examination means).

The secondary examination means to be used for the secondary investigation is made to the principle basically equal to that of the radar means of the pavement structure examination vehicle for the primary investigation, being made in a smaller size so as to be able to examine the underground structure by manually pushing the means on the road. In the present embodiment, the secondary examination means is moved on the road within a range of 5 m square centering on the singular spot investigating the range in a network manner.

Consequently, the underground structure of the road is investigated widthwise which cannot be performed by the primary investigation.

The data obtained by the secondary investigation is analyzed in the same way as the primary investigation to define the presence and planar extent of cavities. In the specified part of the road, an investigation hole with a small diameter is bored and an inner circumferential wall of said bored hole is photographed by photographic means to grasp the conditions of cavities and the ground structure under the road.

In this case, when there are a piece of wood, a small concrete block or a piece of pipe laid underground, sometimes reflective waves similar to those of a cavity are detected from an underground location by the primary investigation, so that it becomes necessary to distinguish whether a cavity is actually present, or if those signals are generated by some object other than a cavity such as; a piece of wood, a small concrete block, or a piece of pipe. Such objects can often be mistaken for a void from the point of view of the investigated results such as planar form and an approximate depth of the image, as determined by the pushcart type underground radar means of the secondary investigation.

Further, by photographing the inner wall surface of the investigation hole with a small diameter, it becomes possible to grasp exactly the conditions of generated cavities and the ground under the road such as a loose condition thereof which has been difficult to confirm by a processing method such as cutting.

Next, description will be made with reference to the means for performing the above cavity examination method, particularly equipment and instruments to be used for the primary investigation.

In FIG. 4, the reference numeral 1 denotes a main control unit which has an image processing unit and is operated by a main control board 1a, being supplied with a constant voltage which is obtained by an electric source 3, whereby adjusting an electricity flow generated by an electric generator of the vehicle or by an electric generator 2 separately mounted on the vehicle.

Figure 6:
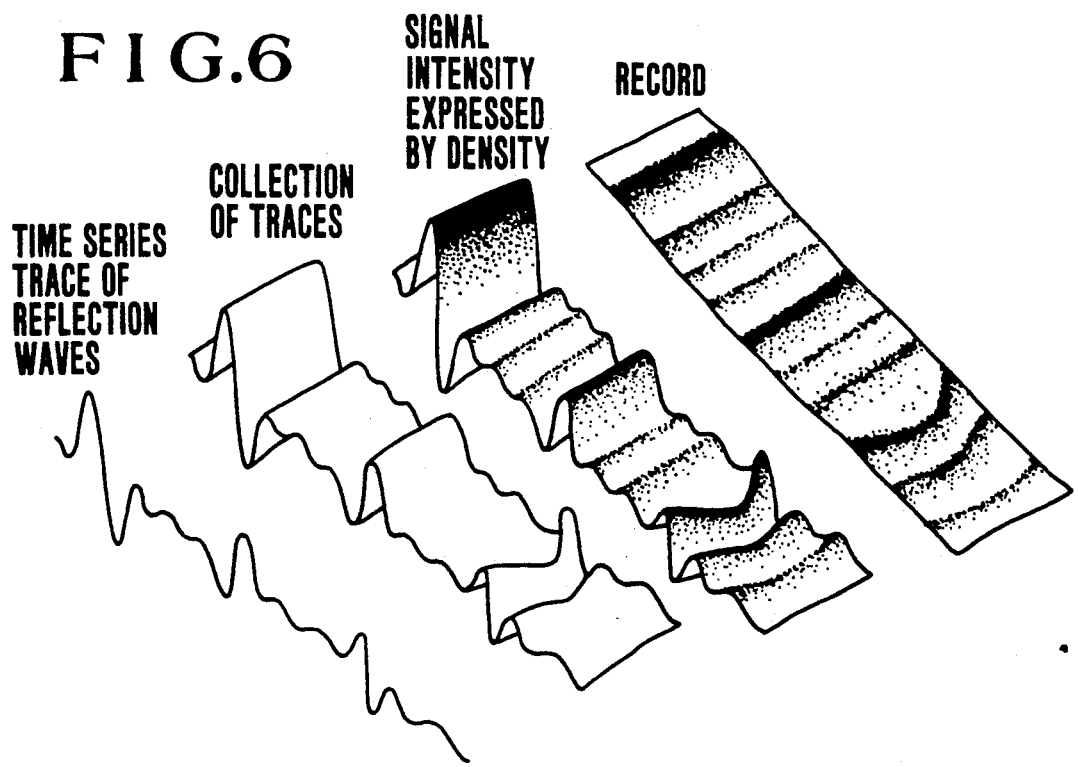
FIG. 6 shows an explanation view for analysis of the data obtained by the principle shown in FIG. 5.

The main control unit 1 transmits electromagnetic waves to an antenna 5, controlling an oscillator 4 which acts as both a transmitter and a receiver of the radar. The control unit 1 transmits electromagnetic waves in pulsation toward the underground as shown in FIG. 6, then receives the reflection waves by the antenna 5, which sends the data observed to the unit 1 via he oscillator 4. This data is usually recorded by a data recorder 6 as analog signals without passing the image processing unit of the main control unit 1. Further, it is desirable to have a radar unit which can cover the whole width of one lane by one traveling, so that it is acceptable to dispose a plurality of radar units in parallel so as to cover the width of the lane.

Further, the observation data of the underground radar is printed out by a chart recorder as shown in FIG. 4 7a, so that it is made possible to grasp the observation results of the radar in real time and also it is made possible to grasp the operating conditions of the underground radar in real time, by means of the images of the reflection waves displayed on an oscilloscope 7b.

Meanwhile, a driver or a crew member such as a measuring staff being on board the vehicle has a telephone unit 7c, and stationed to input circumferential conditions of the road by voice into the data recorder 6 while traveling. Namely, it is made possible for the convenience of the secondary investigation to grasp the circumferential conditions of the road of the specified place where the ground structure is to be investigated, by means of the observation data of the underground radar obtained by the primary ground investigation by superposing thereon the circumferential conditions of the road transmitted by voice. However, it is difficult to specify the location exactly only by voice, and the voice information can offer only an approximate target.

Therefore, in the present invention, a position detection means B is provided for detecting the position of the vehicle from the information of the covered distance and the images of the surroundings of the road.

The position detection means B is composed of an odometer 8 of the vehicle and a video system 9 which comprises a first video camera for photographing side views from the vehicle, a second video camera for photographing front views from the vehicle, and a video recorder for recording image information photographed by the first and second video cameras. The information of the covered distance of the odometer 8 is input into the video recorder of the video system and also into the data recorder 6 through the main control unit 1, at that time the data of the covered distance expressed numerically is superimposed on the respective information of the video recorder and the data recorder.

That is, the covered distance of the vehicle from the starting point of the primary investigation is recorded in the information of images and data observed, so that the place which requires the secondary investigation can be precisely specified. When the vehicle approaches the general location which is approximated by the aforementioned voice information, it is more clearly identified by the scenery of the surrounding area photographed by the video cameras, and finally the precise location can be judged by checking the odometer of the vehicle. In this case, if the secondary examination vehicle is moved to the place of the secondary investigation being mounted by another vehicle without using the cavity examination vehicle for the primary investigation, the primary cavity examination vehicle can continue to perform the primary examination of other roads during that transportation time.

Next, the description of the vehicle which is mounted with the above-mentioned various kinds of apparatus will be made with reference to FIG. 1 through FIG. 3. In the drawings, the reference numeral 80 denotes a vehicle which is called a single box truck which is mounted with a first video camera 81 provided on the side of the vehicle, and a second video camera 82 provided on the front of the vehicle. Circumferential views of the road to the side of the vehicle are photographed by the first video camera 81 thus arranged, front views of the vehicle are photographed by the second video camera 82 thus arranged, and the video system of the position detection means B shown in FIG. 4 is composed of these cameras 81 and 82.

The reference numeral 83 represents an antenna system which contains an antenna of the underground radar and an oscillator both arranged in a unit, and vertically movably supported in the rear of the vehicle. In the present embodiment, as described above, a plurality of antennas, e.g., two antennas, are disposed in parallel to cover one lane of the road. Further, the vehicle is provided with the equipment for the underground radar means such as an electric generator 2, a chart recorder 7a, a main control unit 1, a road work sign 90 and a yellow revolving light 91.

Figure 7:
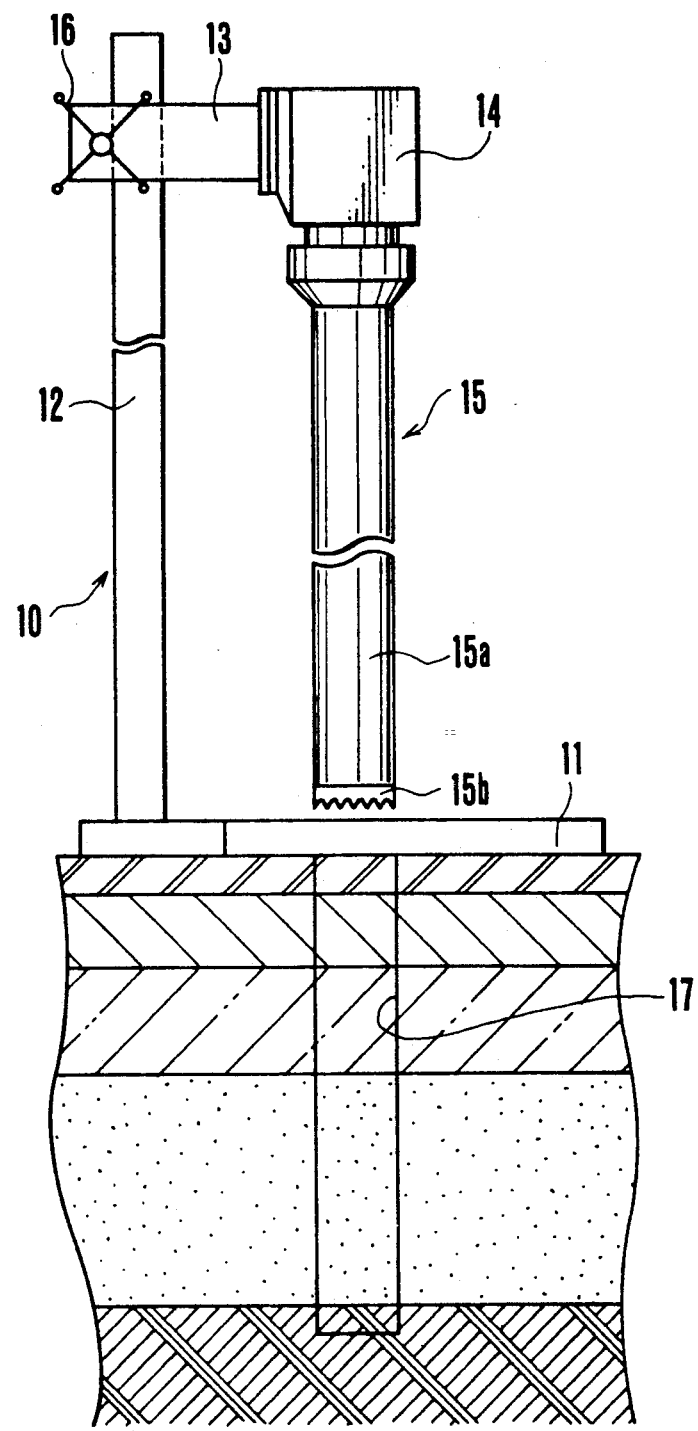
FIG. 7 shows an explanation view for the boring operation.

Description of the investigation by boring will be made with reference to FIG. 7 through FIG. 11. In FIG. 7, the reference numeral 10 denotes a boring stand, wherein a support 12 is erected on a base plate 11 and a drill, for instance, a core drill 14 is attached to a lifting device 13 which is mounted on the support 12.

To this core drill 14, a drill shaft 15 is removably attached for boring an investigation hole, for instance, approximately 1.2 m deep into the pavement, and then bores the pavement by manually operating a lifting handle 16 of the lifting device 13 to vertically and downwardly push the drill 15 which is rotating at high speed. From the viewpoint of an efficient investigation, a preferable diameter of an investigation hole 17 which is bored by the drill 15 is approximately from 3 to 10 cm, and in the present embodiment, the investigation hole is bored with the diameter of 3 cm.

However, the diameter of the investigation hole 17 can be reduced to about 1 through 2 cm in actual use. The drill 15 comprises a cutter 15b made of such as diamond bits attached to the top of a tubular body 15a, and is adapted so as to be able to gather the core of the material of the pavement in the tubular body 15a.

The material of a paved road usually has an asphalt paved floor the depth of which is 50 through 60 cm from the surface of the road, so that while boring this paved floor, water is pressurized into the bore from the start of the boring to prevent wear of the cutter 15b. When the boring of the paved floor is finished, the cutter 15b commences the boring of the sand layer, then the above supply of a pressurized water in the boring operation of the paved floor is stopped to keep an intact state of the inner circumferential wall surface of the hole to be obtained by the boring of the sand layer.

When the drill 15 transfers from the paved floor to the sand layer, it is detected, for example, by the feeling of the hand operating the lifting handle 16 of the lifting device 13, namely, it can be noticed by the fact that the pushing down force applied to the lifting handle 16 in the paved floor suddenly changes from strong to weak. When the lifting device 13 is automatically pushed down, the change in the pushing down force can be detected by means of such as a pressure sensor.

In addition, as is clear from the small diameter of the investigation hole 17 to be bored, the pressurized water which is supplied in the boring operation of the paved floor is required only in a small amount, so that when the boring transfers to the sand layer, a little delay in stopping the supply of pressurized water does not cause excessive saturation of the sand.

The investigation hole 17 to be used for investigating the ground has a depth of 1.2 m which equals the total length of the drill 15, and usually this depth covers the sand layer, but according to circumstances the depth may be made approximately 2 m. When the boring of the investigation hole 17 is finished, a small amount of water is sprayed from such as a nozzle of a water pump to clean the surface of the inner circumferential wall of the investigation hole 17, and consecutively the water is suctioned by a suction pump to prevent the water from collecting in the investigation hole.

Also, it is practicable to clean the surface of the inner circumferential wall of the bored asphalt layer by means of a rotary brush, to make it possible to observe more clearly the surface of the inner circumferential wall of the bored paved-floor. This rotary brush can be equipped in the core drill 14 in place of the drill 15, and by measuring a correct depth of the paved-floor in the boring operation, cleaning of the paved-floor can be performed with this rotary brush without touching the sand layer.

When the above boring operation is finished, the observation of the wall surface of the investigation hole 17 which is 1.2 m deep, bored and cleaned, is conducted over the inner circumferential surface of the wall.

Figure 8:
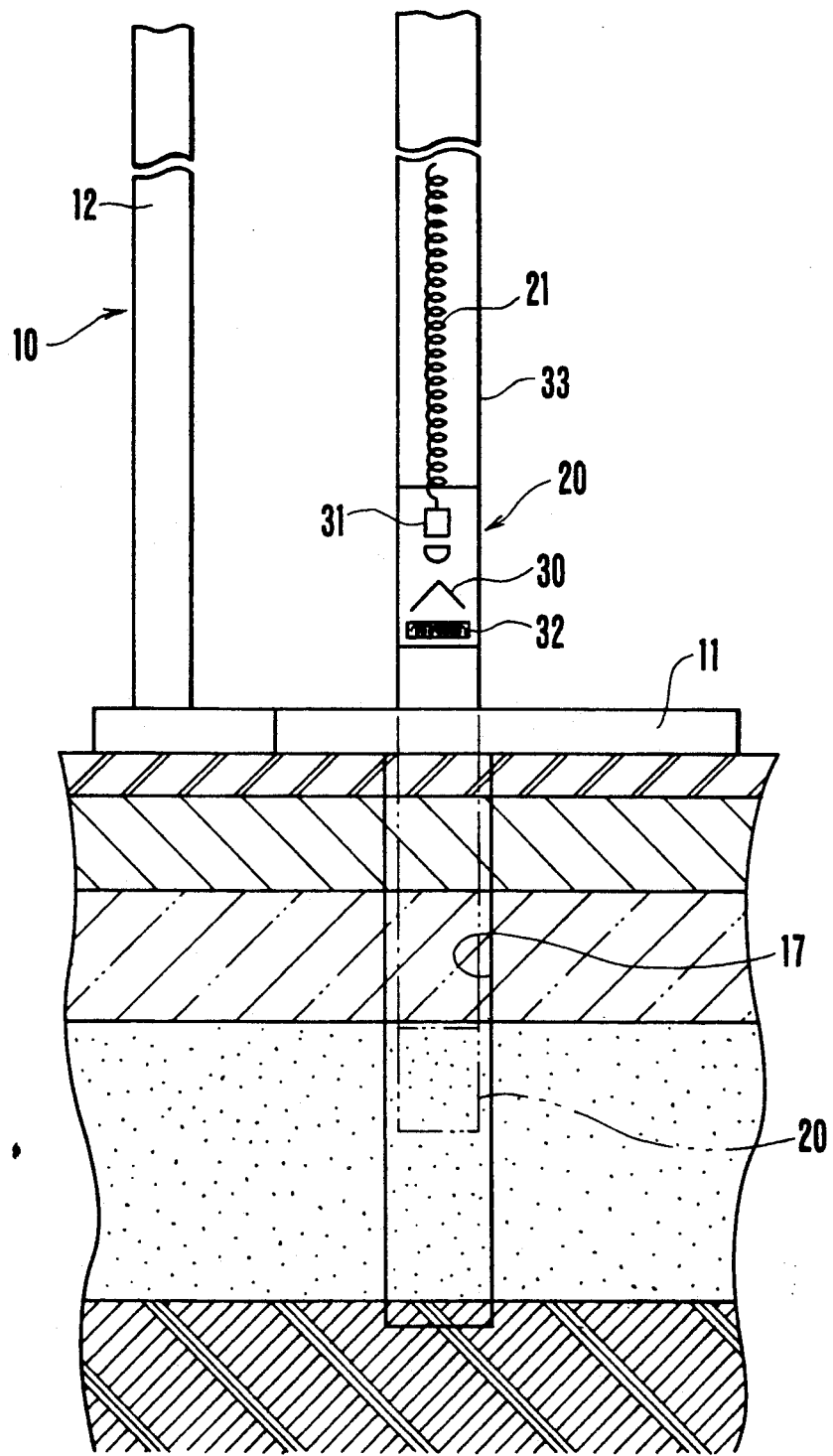
FIG. 8 shows an explanation view for the photographing of an inner circumferential wall of a bored hole.

The outline of this operation is shown in FIG. 8. The observation of the wall surface is conducted by inserting an image pickup means 20 which comprises such as a CCD camera into the investigation hole 17, lowering the device at an almost constant speed and photographing successively all over (360°) the surface of the inner circumferential wall.

Images of the surface of the inner circumferential wall photographed by the image pickup means 20 are input into an image processing unit 22 through a connecting cable 21. On occasion, position data from a later-described position detector 23 of an image pickup device is input into the image processing unit 22 corresponding to information of the photographed images.

Figure 9:
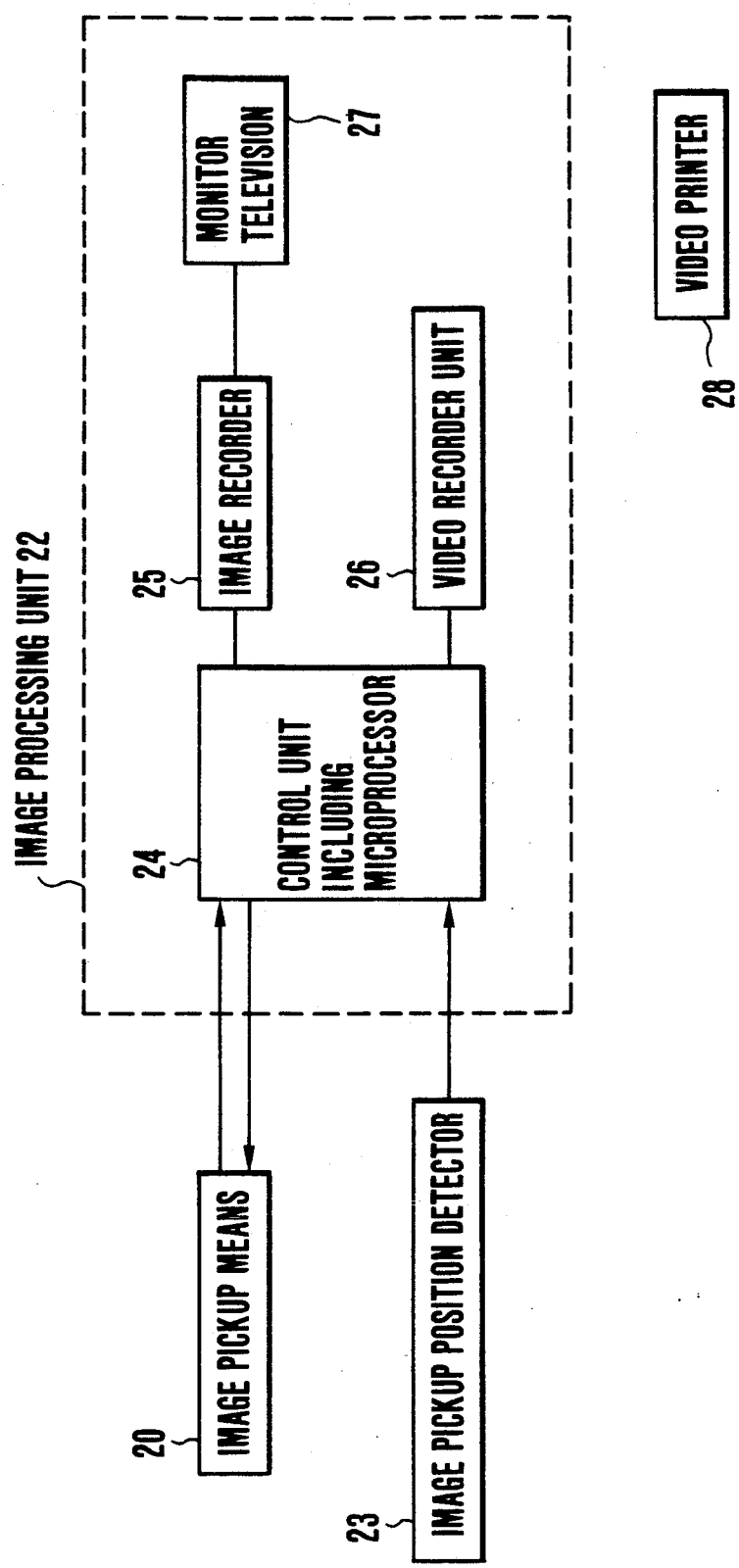
FIG. 9 shows a block diagram showing an image processing unit.

As is shown in FIG. 9, the image processing unit 22 is composed of a control unit 24 which controls the total unit, an image recorder 25 made of a digital recorder which records image information from the image pickup means 20, a video recorder 26 to back up data and a monitor television 27 which monitors the photographed images. Moreover, record information such as image data recorded at the image recorder 25 are input into a video printer 28 directly or through a recording medium such as a floppy disk, and printed out as colored pictures. Furthermore, it can be arranged so that every image on the monitor television 27 is photographed by a still camera.

The image printed out here becomes the images of the developed surface of the inner circumferential wall of the investigation hole 17. In the present embodiment, the image pickup means 20 is arranged so as to be lowered without rotating around the longitudinal center line of the investigation hole 17 to avoid a gap between the programmed and the actual starting position of photographing. This is described in continuation with reference to FIG. 8.

The image pickup means 20 has a conical mirror 30, above which is placed an image pickup device 31 made of CCD whose center of an optical axis of photographing is arranged in coincidence with a center line of the mirror, and by using the image pickup device 31 and by way of the mirror 30, the image pickup means 20 takes a photograph of the surface of the inner circumferential wall of the investigation hole 17 which is illuminated by a battery-powered light source 32. As the result of the above processes, the overall surface of the inner circumferential wall of the investigation hole 17 can be continuously photographed by means of the image pickup device 31.

The image pickup means 20 is fixed to the end of a supporting rod 33 whose diameter is a little smaller than that of the investigation hole 17, and a center axis of the supporting rod 33 and the center line of the optical axis of photographing of the image pickup device 31 are coincident with each other.

In addition, when an investigation hole is approximately 1 cm in diameter, a fiberscope such as those used as a camera for an examination of the interior of a human stomach can be used. In the meantime, the supporting rod 33 has to be inserted into the investigation hole 17 keeping both center axes in coincidence. This is because any gap between two axes causes damage to the image pickup means 20 which is given by the surface of the inner circumferential wall of the investigation hole 17 and because this damage must be avoided.

Figure 10:
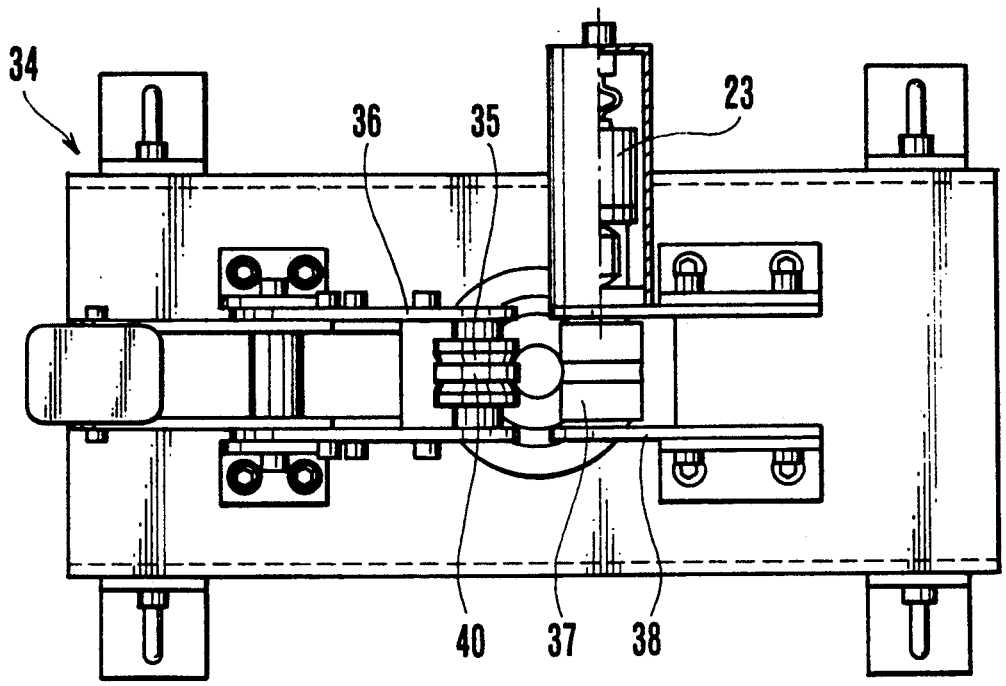
FIG. 10 shows a plan of a support frame.
Figure 11:
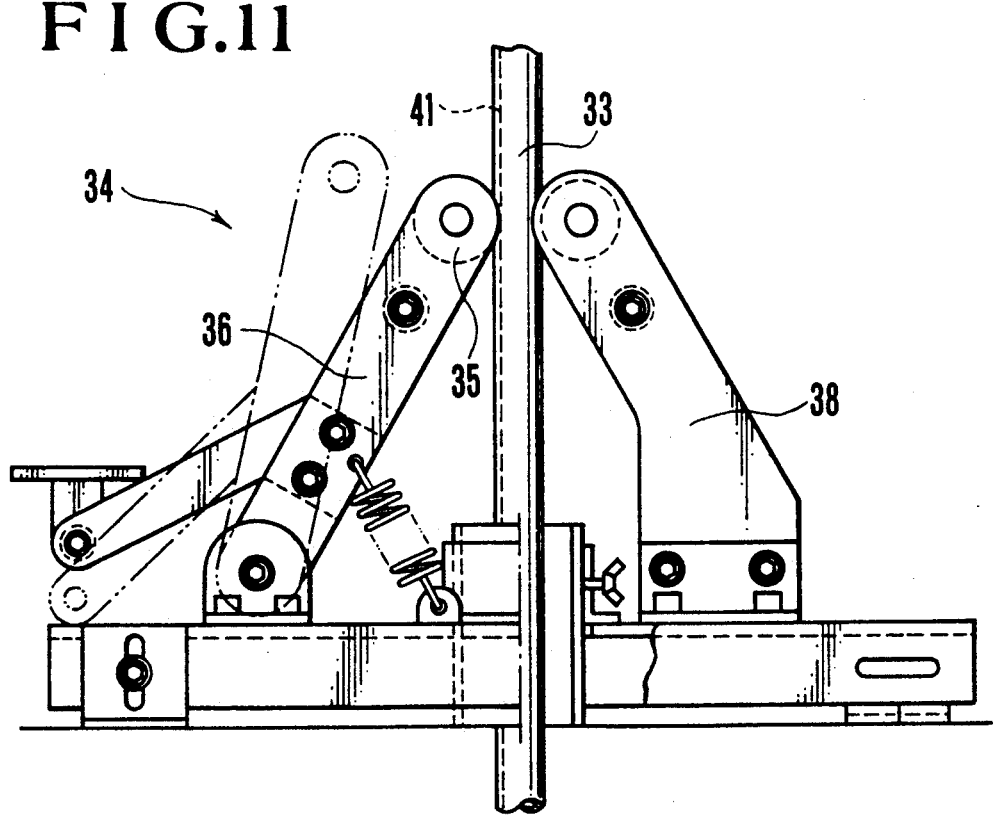
FIG. 11 shows a front view of the support frame.

Therefore, the boring stand 10 is utilized in the present embodiment. Namely, the center axis of the investigation hole 17 is coincident with the center line of the rotary axis of the core drill 14 mounted on the boring stand 10, so that the base plate 11 is left in the same position after the boring operation of the investigation hole 17 is finished, and on which a supporting frame 34 shown in FIG. 10, FIG. 11 is fixed to vertically support and guide the supporting rod 33 at the designated position on the base plate 11. The supporting frame 34 has a guide roller 35 attached to the top thereof, a movable arm 36 the function of which is strengthened by a spring, in the opposed position thereto a measurement arm 38 with a counter roller 37 attached to the top of the arm, and the supporting rod 33 is adapted so as to be inserted between these rollers 35 and 37. The counter roller 37 is arranged so as to rotate in a friction contact with the inserted supporting rod 33 without slipping, and its rotation is detected by the position detector 23 such as a rotary encoder, and the data is input into the image processing unit 22 as the position (vertical position) information of the image pickup means 20.

Meanwhile, a projection 40 is formed on the circumferential surface of the guide roller 35 extending in the circumferential direction, which engages with a fitting groove 41 provided on the outer surface of the supporting rod 33 in the longitudinal direction. That is, the supporting rod 33 is restricted to rotate around the axis when it is inserted into the hole with its fitting groove 41 engaged with the projection 40, and then this makes the image pickup means 20 to be inserted into the hole, for photographing the surface of the inner circumferential wall of the investigation hole 17, move vertically without rotating around the axis.

The supporting rod 33 is attached to a lifting attachment (not shown) to be mounted on the lifting device 13 in place of the core drill 14, and it functions in such a way that when it is inserted into the investigation hole 17 by an operator who manipulates the lifting handle 16, the distance of insertion simultaneously measured by a position detector 39 is recorded in a distance counter display of the image processing unit 22.

When a signal is generated to start the photographing, the image pickup means 20 starts to photograph, and the images taken are recorded in the image recorder 25 and the data-back-up video recorder 26, and at the same time those records are displayed on the monitor television 27 in real time so that the operator can confirm that the data is correctly gathered.

Namely, by inserting the supporting rod into the investigation hole, the surface of the inner circumferential wall of the investigation hole 17 can be photographed continuously all over the length thereof. When the photographing of the investigation hole 17 is finished over the length, the supporting rod 33 is extracted from the investigation hole 17 and the hole is filled up.

In this filling up operation, a rapid-strength mortar cement is first poured into the hole from the bottom up to the part close to the surface layer portion and then the surface layer portion is filled up by an asphalt compound. The investigation hole 17 is small in diameter and is at most about 2 m deep, so that a small amount of a mortar cement suffices to fill up the hole, thus enabling a very efficient repairing operation, and pavement damage is minimal during the operation. That is, it may be said that the investigation by the investigation hole 17 which is small in diameter equals a nondestructive investigation.

In this system, the image data obtained is printed out by the video printer 28, for example, as colored pictures at every photographing, and the data is used to show the depth of the photographing positions together with the images photographed concurrently. By arranging the printed out picture sheets according to their positions upper and lower, the developed pictures of the surface of the inner circumferential wall of the investigation hole 17 can be obtained over the length of the hole.

As described above, according to the present invention, it is possible to investigate conditions of the ground under the paved road extended over a long distance in a reduced time while traveling on the road without disturbing the traffic of other general vehicles by using a vehicle-mounted underground radar means, and by detecting the place on the road which may contain an underground cavity or foreign matter according to the results of the above investigation and by investigating around the place thus detected in a network manner by using a pushcart type underground radar means under a simple traffic control, it is also possible to specify the presence of a cavity and its planar extent, if there is any. Further, it is possible to grasp precisely the condition of the cavity and the under-pavement structure of the ground by a visual inspection according to an inner wall photographing method of a small diameter hole which can be easily repaired afterwards by small-scale construction.

According to the method of the present invention, it becomes possible to detect cavities under paved roads safely, efficiently and precisely while keeping traffic disturbance to a minimum, and also maintain a smooth and safe road traffic condition.

What is claimed

1. A method for examining a cavity present under a paved road, comprising the steps of:
   detecting an abnormal portion under said paved road which may contain a cavity or a foreign substance through investigation of said paved road by a cavity examination vehicle mounted with underground radar means while traveling on said paved road as a primary investigation;
   applying a network of investigation around the place considered to contain any abnormalities by using a pushcart type underground radar means as a secondary investigation;
   boring an investigation hole with a small diameter at a place wherein said cavity as well as its planar extent are determined by said secondary investigation;
   knowing conditions of said cavity and the ground under said paved road by photographing an inner circumferential wall of said bored investigation hole by photographing means.

2. A method for finding and evaluating cavities under a paved road, comprising the steps of:
   performing a primary investigation to detect and locate abnormal conditions under the paved road using a cavity examination vehicle, said vehicle having cavity detecting means and vehicle locating means, said cavity detecting means and vehicle locating means providing preliminary results;
   determining areas to be tested further by interpreting said preliminary results;

performing a secondary investigation on areas determined in said determining step, said secondary investigation performed using pushcart cavity detecting means to provide secondary results;

interpreting said secondary results to confirm the existence of the cavity under the paved surface and to determine cavity boundaries;

boring an investigation hole within said boundaries, the investigation hole having a circumferential wall; and, photographing said circumferential wall to evaluate the cavity.

3. The method of claim 2, wherein said cavity detecting means comprise a radar transmitting and receiving system.

4. The method of claim 2, wherein said primary investigation step investigates the road in a lengthwise direction and said secondary investigation step investigates the road in a widthwise direction.

5. The method of claim 2, wherein said locating means comprises an odometer, video location storage means, and notation storage means.

6. The method of claim 2, wherein said boring step comprises drilling the hole and sensing pressure applied to a drill to effect said boring step, said boring step being stopped when pressure associated with sand is sensed.

7. The method of claim 2, further comprising cleaning said circumferential wall before said photographing step.

8. The method of claim 2, wherein said photographing step comprises inserting an image pickup means within the hole to receive an image and viewing said image.

9. The method of claim 8, wherein said image pickup means is a fiberscope.

10. The method of claim 2, further comprising, filling the hole after said photographing step.

* * * * *